United States Patent

Misso

[11] Patent Number: 6,163,433
[45] Date of Patent: Dec. 19, 2000

[54] AERODYNAMIC PROPELLER LATCH FOR A DISC DRIVE

[75] Inventor: Nigel Frank Misso, Bethany, Okla.

[73] Assignee: Seagate Technology LLC, Scotts Valley, Calif.

[21] Appl. No.: 09/070,067

[22] Filed: Apr. 30, 1998

Related U.S. Application Data

[60] Provisional application No. 60/071,157, Jan. 13, 1998.

[51] Int. Cl.$^7$ .................................................. G11B 21/22
[52] U.S. Cl. ............................................................. 360/105
[58] Field of Search ...................................... 360/105, 106

[56] References Cited

U.S. PATENT DOCUMENTS

| | | | |
|---|---|---|---|
| 5,036,416 | 7/1991 | Mastache | 360/105 |
| 5,283,705 | 2/1994 | Iwabuchi | 360/105 |
| 5,319,511 | 6/1994 | Lin | 360/105 |
| 5,602,700 | 2/1997 | Viskochil et al. | 360/105 |
| 5,623,384 | 4/1997 | Hickox et al. | 360/105 |

Primary Examiner—William R. Korzuch
Attorney, Agent, or Firm—Crowe & Dunlevy

[57] ABSTRACT

An actuator latch for latching an actuator of a disc drive having a rotating disc that induces airflow when the disc drive is operational, the actuator latch having a horizontally disposed shaft supported by a pair of bearing clips for sliding and rotational movement of the shaft, the shaft supporting a plurality of propeller blades to rotate the shaft in response to airflow generated by rotation of the disc. A torsion return spring is attached to the shaft at a proximal end and to the disc drive at a proximal end, so that rotation of the shaft winds up the torsion return spring and urges the shaft longitudinally in a direction toward the torsion spring distal end. In the absence of airflow the torsion spring unwinds and urges the shaft in a direction away from the distal end thereof. A locking member is attached to the shaft and abuttingly engages the actuator in a non-rotated mode of the shaft wherein the actuator latch is in a latched mode, and wherein the locking member disengages and clearingly advances away from the actuator in an unlatched mode of the actuator latch.

10 Claims, 4 Drawing Sheets

AERODYNAMIC PROPELLER LATCH FOR A DISC DRIVE

RELATED APPLICATIONS

This application claims the benefit of U.S. Provisional Application Ser. No. 60/071,157 entitled PROPELLER LATCH, filed Jan. 13, 1998.

FIELD OF THE INVENTION

The present invention relates generally to the field of disc drive data storage devices, and more particularly but not by way of limitation, to an improved aerodynamic latch for an actuator of a disc drive.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc stack envelope. The surfaces of the stacked discs, forming a disc stack, are accessed by the read/write heads which are mounted on a complementary stack of actuator arms which comprise an actuator assembly, or E-block. The E-block generally includes head wires which conduct electrical signals from the read/write heads to a flex circuit which, in turn, conducts the electrical signals to a flex circuit connector mounted to a disc drive basedeck. A general discussion of E-block assembly construction can be found in U.S. Pat. No. 5,404,636 entitled METHOD OF ASSEMBLING A DISC DRIVE ACTUATOR, issued Apr. 11, 1995, to Stefansky et al., and assigned to the assignee of the present invention.

When the disc drive is not in use, the read/write heads are parked in a position separate from the data storage surfaces of the discs. Typically, a landing zone is provided on each of the disc surfaces where the read/write heads are positioned before the rotational velocity of the spinning discs decreases below a threshold velocity which sustains the air bearing. The landing zones are generally located near the inner diameter of the discs.

Once the heads are positioned in the landing zones, it is necessary to secure the actuator assembly by a latching arrangement to prevent the heads from subsequently moving out onto the data surfaces of the discs while the disc drive is not in use. Latching arrangements are well known in the art and have included various configurations of springs, solenoids and magnets to secure and release the actuator. For example, see U.S. Pat. No. 5,187,627 entitled MAGNETIC LATCH AND CRASH STOP, issued Feb. 16, 1993, to Hickox and Stram; U.S. Pat. No. 5,224,000 entitled CRASH STOP AND MAGNETIC LATCH FOR A VOICE COIL ACTUATOR, issued Jun. 29, 1993, to Casey and West; and U.S. Pat. No. 5,231,556 entitled SELFHOLDING LATCH ASSEMBLY, issued Jul. 27, 1993, to Blanks. All of these references are assigned to the assignee of the present invention.

In addition to the latch mechanisms mentioned above, there have been efforts to couple the operation of a latching device with the airflow generated by the rotation of the discs. That is, it is known to use the energy of the air currents generated by the rotation of a plurality of stacked discs to release a passive, spring-loaded aerodynamically responsive latch. For example, such latches are taught in U.S. Pat. No. 4,647,997 entitled AERODYNAMIC LATCH FOR DISK FILE ACTUATOR, issued Mar. 3, 1987, to Westwood; and U.S. Pat. No. 5,043,834 entitled ACTUATOR LOCKING SYSTEM OF DISK UNIT, issued Aug. 27, 1991, to Kubo, Masuda and Nakagawa.

Associated problems with such devices have limited the application in which they can be used. For example, a continuing trend in the industry is the reduction in size of modern disc drives. As a result, the discs of modern disc drives increasingly have smaller diameters and tighter spacings. Although providing increasing amounts of storage capacity, narrow vertical spacing of the discs gives rise to a problem of increased sensitivity to external mechanical shock. Additionally, as disc drives continue to decrease in size, smaller heads, thinner substrates, longer and thinner actuator arms and thinner gimbal assemblies continue to be incorporated into the disc drives. These factors significantly increase the need to protect the disc drives from incidental contact between the actuator arm/gimbal assemblies and the disc surfaces. Furthermore, market requirements demand ever increasing non-operating shock performance.

Consequently, there has not been available a latching device which will universally meet the ever increasing demands of disc latching that will protect the discs from the deleterious effects of non-operational shock such as can occur during shipping and handling. Protection from this and other non-operating mechanical shocks continue to be a major problem to the industry.

Another problem with prior art aerodynamic actuator latches is that they have a tendency to release the actuator prematurely. The prior art teaching commonly includes a spring-biased lever which abuts the actuator on one end to secure it in place when the disc drive is not operating. The other end of the lever typically has a vane which is deflected by the air current generated by the spinning discs when the disc drive is operating. The air current shifts the lever to a non-biased position where the first end clearingly disengages the actuator so that the actuator can freely move. A common problem, however, is associated with the fact that only a relatively small torque is necessary to release the lever, typically less than 2 gram-meters. Movement of the lever is easily triggered by non-operating torques because forces greater than this magnitude and more are very common in normal shipping and handling activities. Such non-operating forces often result in the disengagement of the lever from the actuator while the disc drive is not operating. Since the discs are not spinning there is no air bearing, so a free moving actuator can cause the read/write heads to contact the data storage tracks, likely causing damage to the data storage surfaces.

Accordingly, there is a need for an improved aerodynamically driven latch apparatus for a disc drive to reduce the susceptibility of damage to the disc drive as a result of non-operating mechanical shocks.

SUMMARY OF THE INVENTION

The present invention provides a latch apparatus for latching the actuator of a disc drive during the time that the disc drive is in a non-operational mode.

In a preferred embodiment, a disc drive assembly has a basedeck on which is supported a spindle motor assembly that supports and rotates a plurality of discs about a common central axis, each of the discs having a data recording surface and a parking surface. An actuator assembly is supported by the basedeck and has a plurality of actuator arms controllably rotatable over, and radially extending adjacent to, the data recording and landing surfaces of the discs. The actuator arms support read/write heads adjacent the data recording surfaces for reading data from and writing data to the recording surfaces.

In an operating mode of the disc drive, the spindle motor rotates the discs which, in turn, induce an airflow in the disc drive. An actuator latch assembly is provided which has a substantially horizontal shaft supported by a bearing clip so that the shaft can be rotated and displaced longitudinally. The shaft has a number of propeller blades attached thereto that are in the airflow so that the airflow imparts rotation to the shaft. A locking member is supported by the shaft and is thereby rotatable between a latched position and an unlatched position. In the latched position, the actuator is secured by the locking member so that the read/write head remains in the landing surface, and in the unlatched position, the actuator is released so that the read/write head is free to move over the data recording surface. A torsion return spring resists the force provided by the airflow to return the shaft to the latched position after the disc drive switches to the inoperable mode.

These and various other features as well as advantages which characterize the present invention will be apparent from a reading of the following detailed description and a review of the associated drawings.

DETAILED DESCRIPTION

Figure 1:
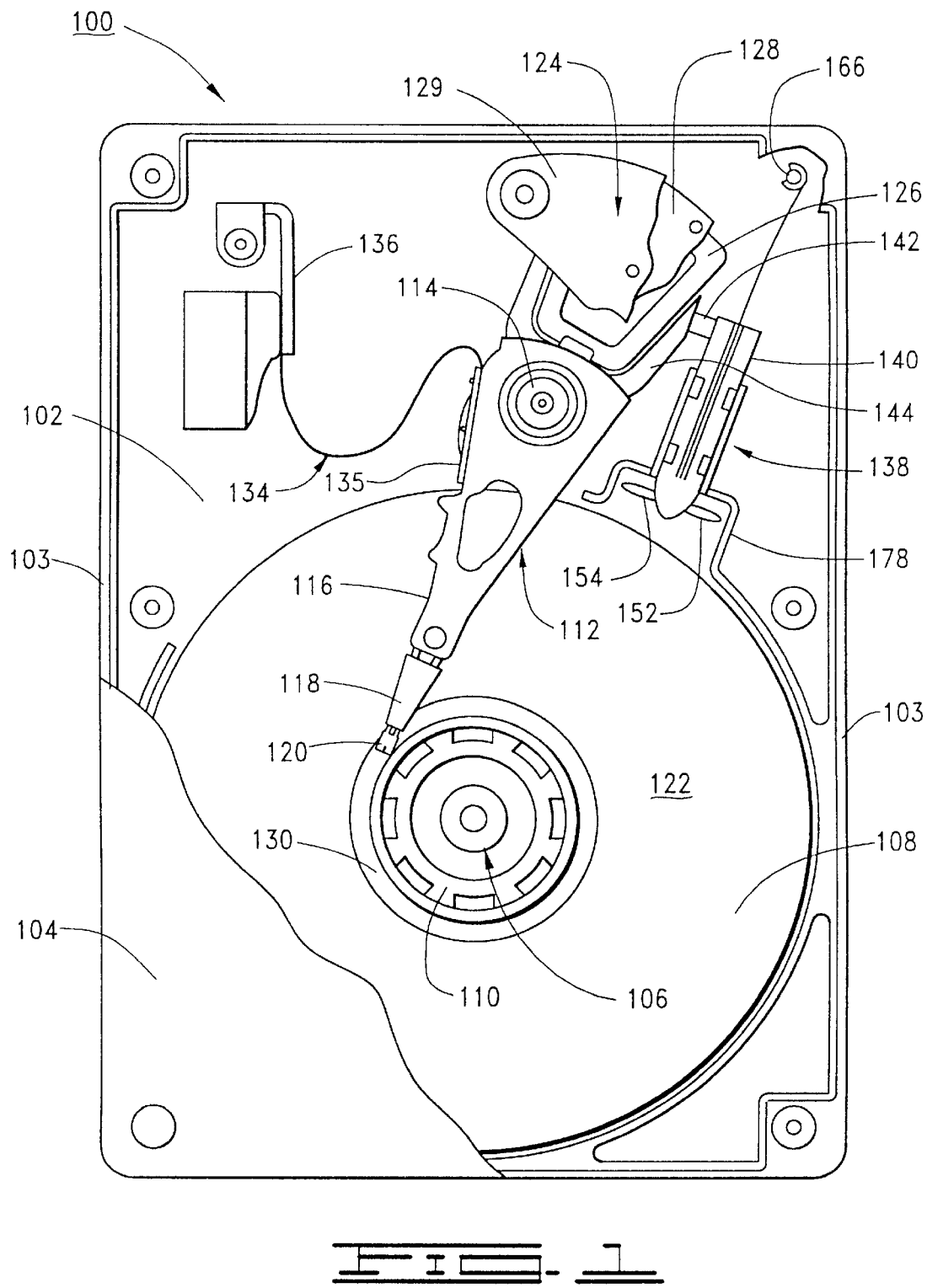
FIG. 1 is a top view of a disc drive constructed in accordance with the present invention and showing the latch assembly in the latched position.
Figure 2:
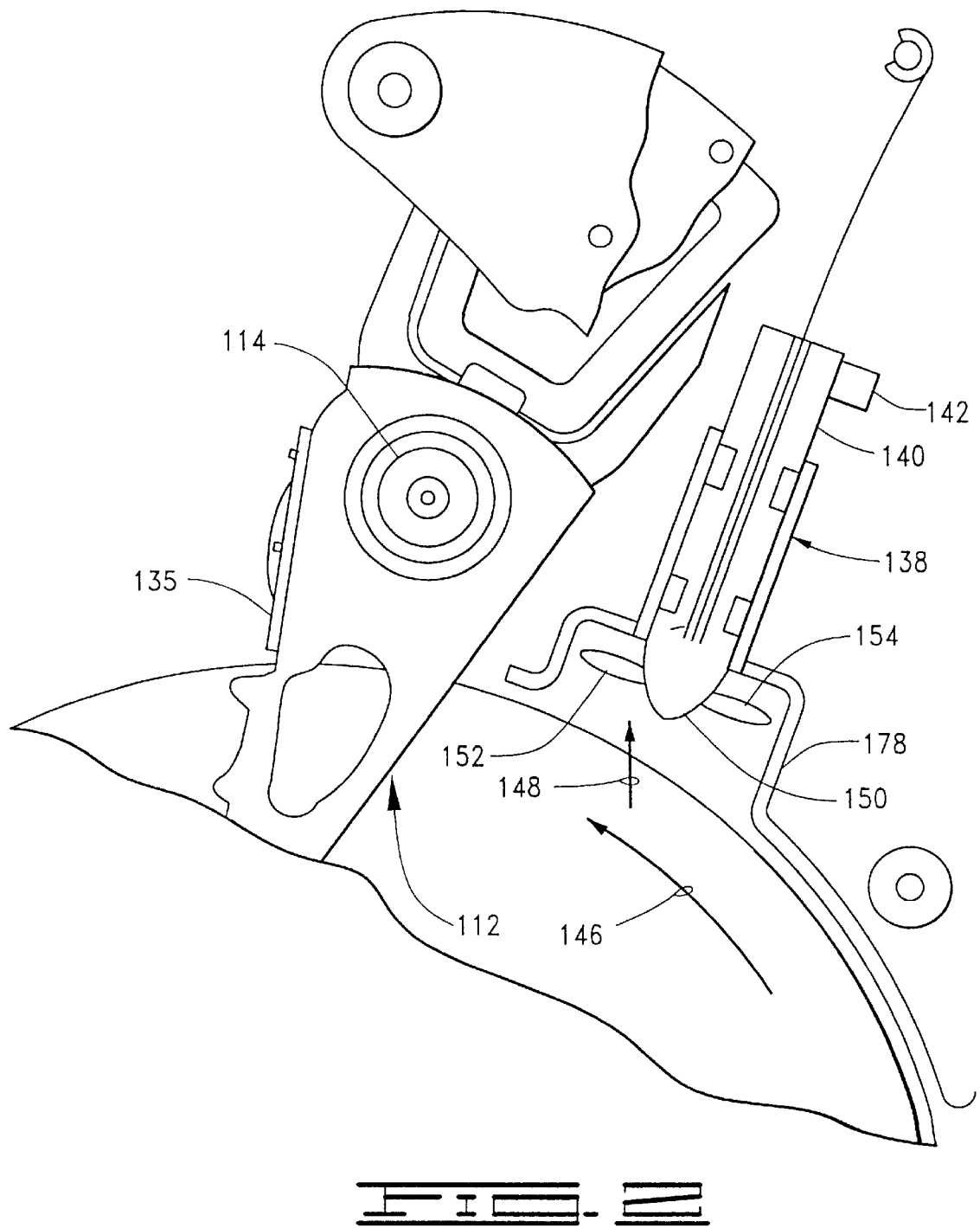
FIG. 2 is a top view of a portion of the disc drive of FIG. 1 with the latch assembly moved to the unlatched position.

Referring to the drawings in general, and more particularly to FIGS. 1 and 2, shown therein are top views of a disc drive 100 constructed in accordance with a preferred embodiment of the present invention. The disc drive 100 includes a basedeck 102 to which various disc drive components are mounted, and a top cover 104, which together with the basedeck 102 and a perimeter gasket 103 provides a sealed internal environment for the disc drive 100. The top cover 104 is shown in a partial cut-away fashion to expose selected components of interest. It will be understood that numerous details of construction of the disc drive 100 are not included in the following description, as such, they are well known to those skilled in the art and are believed to be unnecessary for the purpose of describing the present invention.

Mounted to the basedeck 102 is a spindle motor 106 to which a plurality of discs 108 are mounted and secured by a clamp ring 110 for rotation at a constant high speed. Adjacent the discs 108 is an actuator assembly 112 (sometimes also referred to as an "E-block") which pivots about a pivot shaft bearing assembly 114 in a rotary fashion. The actuator assembly 112 includes actuator arms 116 (only one shown) that support load arm assemblies 118. The load arm assemblies 118 in turn support read/write heads 120, with each of the heads 120 adjacent a surface of one of the discs 108. As mentioned hereinabove, each of the discs 108 has a data recording surface 122 divided into concentric circular data tracks (not shown), and the heads 120 are positionably located adjacent data tracks to read data from, or write data to, the tracks.

The actuator assembly 112 is controllably positioned by way of a voice coil motor assembly (VCM) 124, comprising an actuator coil 126 immersed in the magnetic field generated by a permanent magnet 128. A magnetically permeable flux path, such as a steel plate 129, is mounted above the actuator coil 126 to complete the magnetic circuit of the VCM 124. When controlled current is passed through the actuator coil 126, an electromagnetic field is set up which interacts with the magnetic circuit of the VCM 124 to cause the actuator coil 126 to move relative to the permanent magnet 128 in accordance with the well-known Lorentz relationship. As the actuator coil 126 moves, the actuator assembly 112 pivots about the pivot shaft bearing assembly 114, causing the actuator arms 116 to move the heads 120 adjacent to, and across, the discs 108. Located near the inner clamp ring 110 are parking surfaces 130, the parking surfaces 130 being non-data surfaces that are designated areas where the heads 120 come to rest when the disc drive 100 becomes non-operational, the provision of the parking surfaces 130 preventing the heads 120 from damaging any data storage locations.

To provide the requisite electrical conduction paths between the heads 120 and disc drive read/write circuitry (not shown), head wires (not separately shown) are routed on the actuator assembly 112 from the heads 120, along the load arm assemblies 118 and the actuator arms 116, to a flex circuit 134. The head wires are secured by way of a suitable soldering process to corresponding pads of a printed circuit board (PCB) 135 of the flex circuit 134. In turn, the flex circuit 134 is connected to a flex circuit bracket 136 in a conventional manner, which in turn is connected through the basedeck 102 to a disc drive PCB (not shown) mounted to the underside of the basedeck 102. The disc drive PCB provides the disc drive read/write circuitry which controls the operation of the heads 120, as well as other interface and control circuitry for the disc drive 100.

Shown in FIG. 1 is a latch assembly 138 in a latched position which constrains the movement of the actuator 112 so that the heads 120 are restricted to the parking surfaces 130 of the discs 108. The latch assembly 138 has a substantially horizontally disposed shaft 140 that supports a locking member 142. In the position of the shaft 140 shown in FIG. 1, the locking member 142 abuttingly engages a coil support portion 144 of the actuator 112. This abutting engagement prevents rotation of the actuator 112 about the bearing cartridge 114 so as to provide latching restraint thereof. It will be noted that this position of the locking member 142, and hence the latching restraint of the actuator 112, occurs when the disc drive 100 is in the inoperable mode, such as when the discs 108 are not spinning or are spinning down at speeds below a threshold speed, as will be discussed further below.

FIG. 2 shows the disc drive of FIG. 1 wherein the discs 108 are spinning in a counter-clockwise direction, as indicated by directional arrow 146, either at a full operating rotational speed or at increasing speeds above the threshold speed. The spinning discs impart an airflow having a tangential and a radial direction component, resulting in an airflow generally along the line 148 toward the latch assembly 138.

It will be noted that the shaft 140 of the latch assembly 138 has a leading end with a nose cone 150 which supports a pair of propeller blades 152, 154. The propeller blade 152 is canted such that a leading tip thereof is above a longitudinal centerline of the shaft 140. The propeller blade 154 is opposingly canted relative to the propeller blade 152, by having a leading tip thereof below the longitudinal centerline of the shaft 140. In this manner the airflow produces a sufficient force on the propeller blades 152, 154 to impart a torsion sufficient to rotate the shaft 140. This torsion is proportional to the magnitude of the airflow, which is determined by the rotational speed of the discs 108. The size and pitch of the propeller blades 152, 154 are selected so that a desired airflow produces a torsion sufficient to rotate the shaft 140, this desired airflow selectable as that which is provided by the discs 108 at substantially full rotational speed or some fractional portion thereof, the fractional portion thereof defining the threshold rotational speed below which the airflow is insufficient to rotate the shaft 140.

Figure 3:
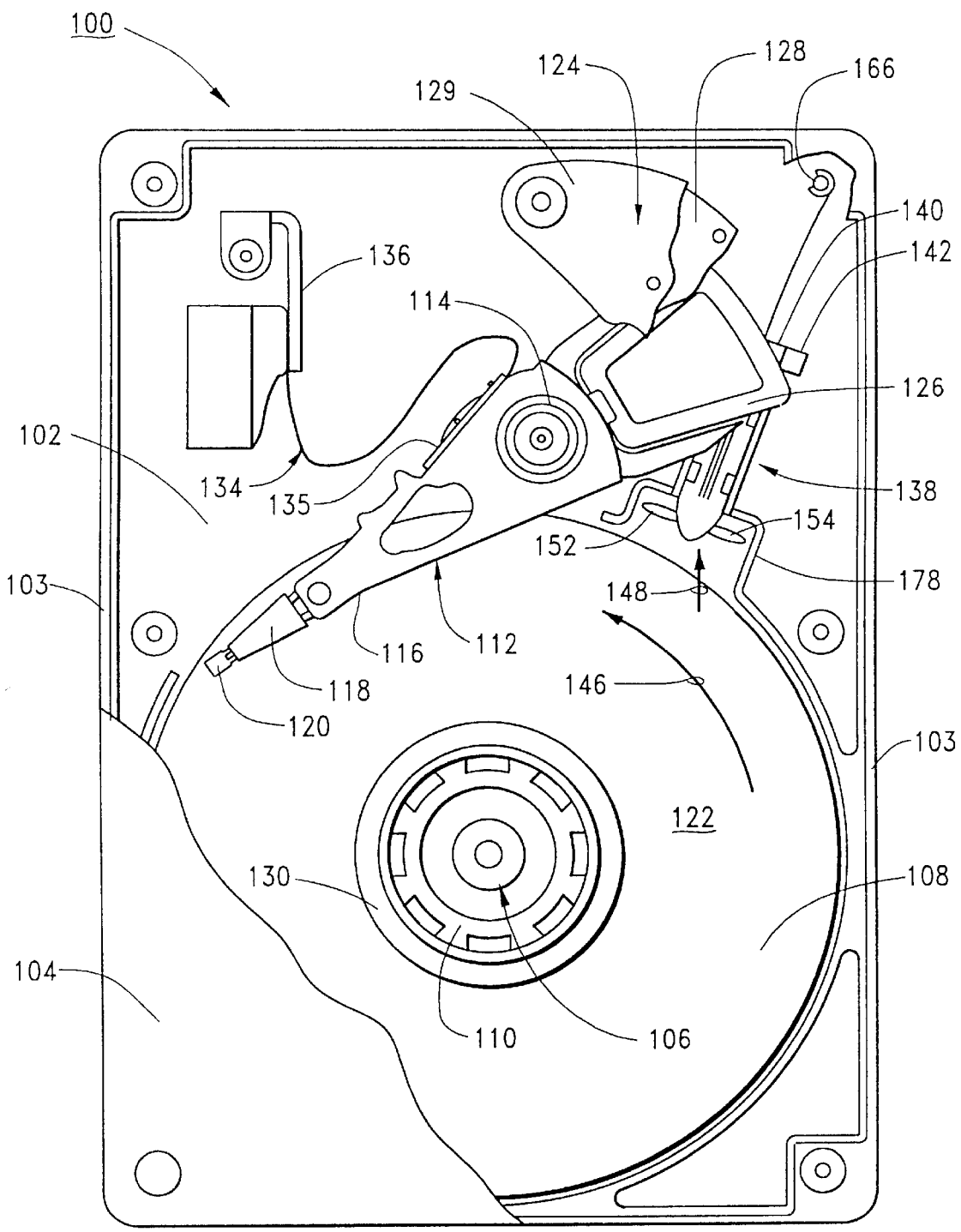
FIG. 3 is a top view of the disc drive of FIG. 1 and FIG. 2 with the latch assembly in the unlatched position and the actuator positioned so as to place the read/write head at a selected data track.

FIG. 2 shows the position of the shaft 140 when an airflow has rotated the shaft 140. It will be noted that in the rotated position the locking member 142 is moved away from the coil support portion 144, no longer providing an abutting engagement thereagainst. In this position of the shaft 140 it will be clear that the actuator 112 is unlatched and may be rotated about the cartridge bearing 114 in response to seek commands to place the heads 120 adjacent selected data tracks within the data recording surface 122. FIG. 3 shows the latch assembly 138 in the unlatched position, as in FIG. 2, and the actuator 112 rotated to place the heads 120 adjacent a selected data track. It will be noted as the actuator 112 rotates, the coil 126 clearingly passes by the locking member 142 and above the shaft 140.

Figure 4:
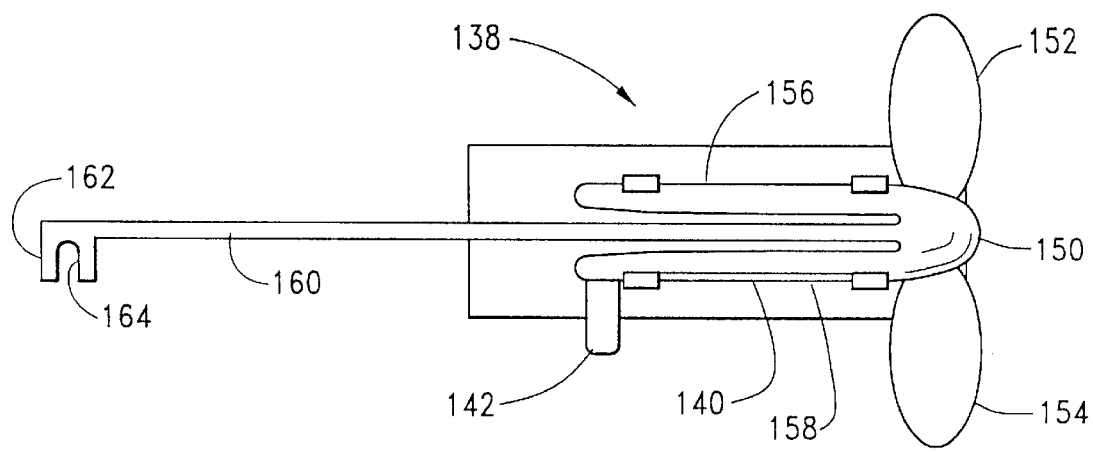
FIG. 4 is a top view of an actuator latch constructed in accordance with the present invention.
Figure 5:
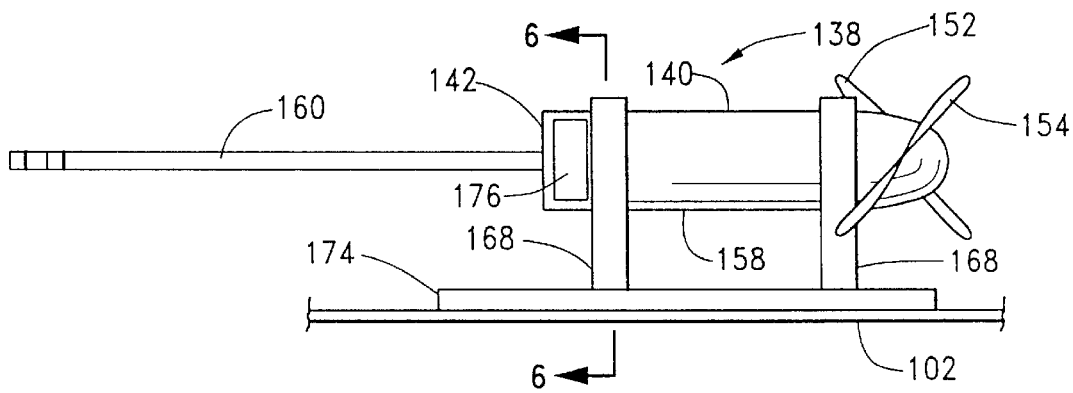
FIG. 5 is an elevational view of the actuator latch of FIG. 4.
Figure 6:
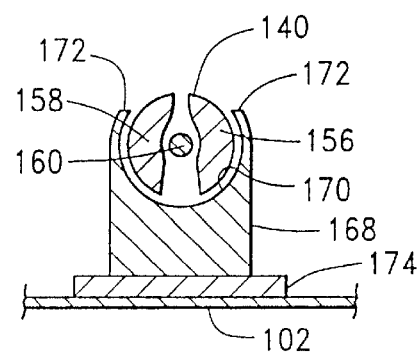
FIG. 6 is a sectional view of the actuator latch of FIG. 5 taken along the line 6—6 thereof.

Turning now to FIG. 4 it will be noted that in a preferred embodiment shown therein the shaft 140 is a of a unitary construction molded of a relatively stiff and moldable material such as, but not limited to, polyphenylene sulfide. The shaft 140 has a pair of opposingly separated longitudinal members 156, 158 and a centrally disposed longitudinal member 160 (sometimes referred to as a "torsion return spring"), all of which depend from the nose cone 150. FIG. 5 shows an elevational view of the latch assembly 138, from which the sectional view of FIG. 6 is taken. From FIG. 6 is will be noted the longitudinal members 156, 158, and 160 are all separated relative to each other, that is, the longitudinal members 156, 158 rotate, in response to the torsion on the shaft 140, about and independently of the torsion return spring 160.

Returning to FIG. 4, a distal end of the torsion return spring 160 supports a hold-down bracket 162, the bracket 162 having a slotted opening 164. As shown is FIGS. 1 through 3, the bracket 162 clips to a stationary portion of the disc drive 100, such as a threaded standoff 166 which is otherwise used in the attachment of the basedeck 102 and the top cover 104. In alternative preferred embodiments the bracket 162 can be secured to any fixed surface in the disc drive 100, such as an attachment screw or a suitable fixed component.

As shown in FIG. 2 and FIG. 3, as the airflow rotates the shaft 140 a medial portion of the torsion return spring 160 is wound up due to the fixed support of both ends thereof. This winding action shortens the length of the torsion return spring 160 and thereby urges the shaft 140 to move longitudinally in a direction toward the bracket 162. This longitudinal movement of the shaft 140 provides for movement of the locking member 142 to a position clearingly removed from and unobtrusive of the movement of the actuator 112. When the disc drive is shut down the airflow eventually drops below the threshold level such that an unwinding torsion force of the torsion return spring 160 is greater than the counter-acting torsion provided by the airflow. At that point, and at all airflows less than the threshold airflow, the torsion return spring 160 unwinds, thereby increasing the length thereof and urging the shaft 140 to move back to the original position where the locking member 142 obstructs the movement of the actuator 112 in the latched position.

FIG. 5 shows the shaft 140 is supported for rotational and longitudinal movement as described above by a pair of bearing clips 168. The bearing clips 168 form a receiving diameter 170 (see FIG. 6) having a radius of curvature to receivingly engage the shaft 140 for sliding support thereof. The bearing clip 168 has a pair of retaining portions 172 which are spreadable to permit placement of the shaft 140 into the receiving diameter 170. It will be further noted that the opposing longitudinal members 156, 158 can be pressed together to reduce the effective diameter of the shaft 140 in order to facilitate placing the shaft 140 into the receiving diameter 170. Once inserted, however, the retaining portions 172 provide a compressive force against the shaft 140 for retention thereof in the receiving diameter 170. The bearing clips are supported by a base 174 which, in turn, is attached to the base deck 102.

FIG. 5 shows a preferred embodiment wherein the locking member 142 is formed with a hollow central portion 176 which provides reduced weight and a reduced moment in opposition to the torsion force acting to rotate the shaft 140.

Finally, FIGS. 1 through 3 shows a shroud 178 formed to surround the leading portion of the latch assembly 138, namely surrounding the nose cone 150 and the propeller blades 152, 154. The shroud 178 serves to collect the airflow and concentrate the force thereof at a location where the airflow impacts against the propeller blades 152, 154. It will also be noted that the nose cone 150 has a radiused leading edge and an arcuate profile which guides the airflow across the propeller blades 152, 154.

Thus, the present invention provides an actuator latch assembly (such as 138) for an actuator (such as 112) of a disc drive (100) having a rotatable disc (108). The actuator latch assembly has a horizontally disposed rotatable and longitudinally displaceable shaft (such as 140) which supports a plurality of propeller blades (such as 152, 154) that are disposed in the airflow established by rotation of the disc during operation of the disc drive. The airflow impinges against the propeller blades and imparts rotation to the shaft.

The latch assembly has a locking member (such as 142) that is rotated by the shaft from a latched position to an unlatched position. A torsion return spring (such as 160) is fixed at a first end to the shaft and fixed at a distal end to the basedeck of the disc drive, so that rotation of the shaft winds up and shortens the torsion spring. Shortening the torsion return spring urges the shaft to move longitudinally so as to disengage the locking member from the actuator. Unwinding of the torsion return spring returns the locking member to pressing engagement with the actuator in a latched position. The torsion return spring is wound up by an airflow created by spinning of the discs during operation of the disc drive. The torsion return spring winds down when the disc drive switches to an inoperable mode and the discs cease spinning.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed. For example, the particular elements may vary depending on the particular application for the aerodynamic latch for a disc drive while maintaining substantially the same functionality without departing from the scope and spirit of the present invention.

What is claimed is:

1. An apparatus for latching an actuator assembly of a disc drive having a rotatable disc, the apparatus comprising:
    a bearing clip;
    a rotatable horizontal shaft, disposed in the bearing clip;
    a plurality of propeller blades supported by the shaft which induce rotation of the shaft in response to airflow established by rotation of the disc; and
    a locking member supported by the shaft which unlatches the actuator assembly in response to the rotation of the shaft.

2. The apparatus of claim 1, further comprising:
    a biasing member attached to the shaft which rotates the locking member to a latched position in response to non-rotation of the disc.

3. The apparatus of claim 2, wherein the shaft comprises:
    a first longitudinal member forming an arcuate surface;
    a second opposing longitudinal member spatially disposed from the first longitudinal member and forming an opposed arcuate surface which in cooperation with the first longitudinal member forms a cylindrical body having a longitudinal gap between the longitudinal members; and wherein said biasing member comprises a torsion return spring member passing through the gap.

4. The apparatus of claim 3, wherein the shaft is provided with a nose cone portion supporting the propeller blades, the nose cone portion having a radiused surface which directs the airflow across the propeller blades.

5. The apparatus of claim 4, wherein the locking member is provided with a central cavity to reduce the weight of the locking member resulting in a reduced moment of inertia on the shaft.

6. A disc drive, comprising:
    a baseplate;
    a spindle motor assembly supported by the baseplate;
    a disc supported by the spindle motor assembly for rotation when the disc drive is operational, the rotating disc inducing an airflow, the disc having a data recording surface and a landing surface;
    an actuator assembly pivotally supported by the baseplate;
    a head supported by the actuator and moveable by the actuator adjacent to the data recording surface and the landing surface; and
    an actuator latch assembly to latch the actuator in a fixed position when the disc drive is non-operational, the actuator latch assembly being supported by the baseplate and comprising:
        a horizontal shaft rotatable in a first rotatable direction and in a second rotatable direction; and
        a plurality of propeller blades supported by the shaft to rotate the shaft in the first rotatable direction in response to the airflow from rotation of the disc when the disc drive is operational;
    a locking member supported by the shaft and moveable between a latched position where the actuator is fixed in position with the head at the landing surface and an unlatched position where the actuator is free to move the head over the data recording surface; and
    a biasing member to rotate the shaft in the second rotatable direction when the airflow ceases.

7. The disc drive of claim 6, wherein the shaft comprises:
    a first longitudinal member forming an arcuate surface;
    a second opposing longitudinal member spatially disposed from the first longitudinal member and forming an opposed arcuate surface which in cooperation with the first longitudinal member forms a cylindrical body having a longitudinal gap between the longitudinal members; and wherein said biasing member comprises a torsion return spring member passing through the gap.

8. The disc drive of claim 7, wherein the shaft is provided with a nose cone portion supporting the propeller blades, the nose cone portion having a radiused surface which directs the airflow across the propeller blades.

9. The apparatus of claim 8, wherein the locking member is provided with a central cavity to reduce the weight of the locking member resulting in a reduced moment of inertia on the shaft.

10. A method for latching an actuator of a disc drive assembly in a fixed position when the disc drive is not operational, and for unlatching the actuator when the disc drive is operational, the method comprising steps of:
    (a) rotating a disc of the disc drive assembly when the disc drive is operational, the rotating disc inducing an airflow within the disc drive assembly;
    (b) rotating a horizontal shaft that supports a locking member by providing a plurality of vanes attached to the shaft which rotate in response to the airflow to unlatch the actuator; and
    (c) biasing the shaft to a position where the locking member latches the actuator when the disc drive is not operational.

* * * * *